Figure 1:
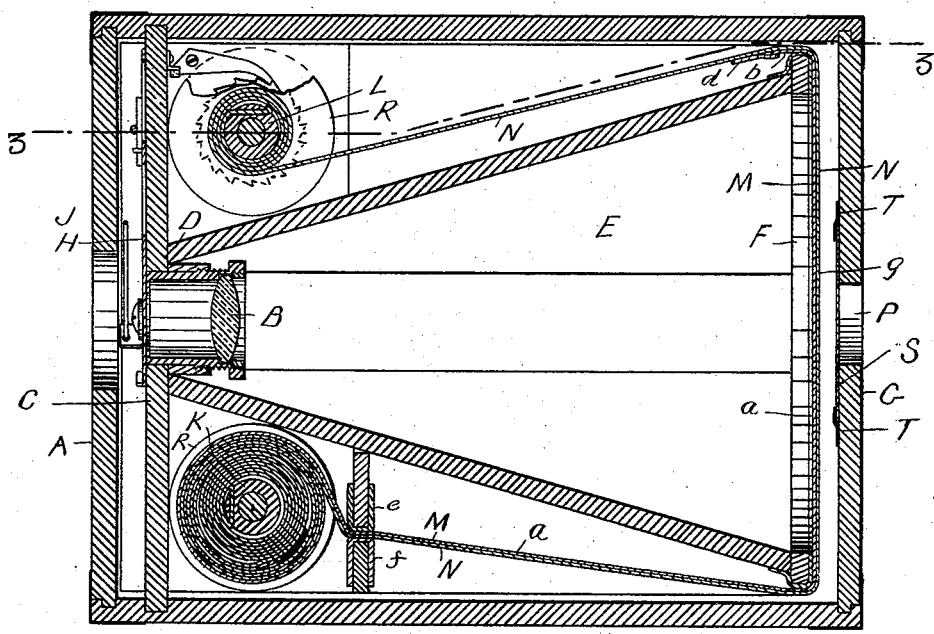

(No Model.) 2 Sheets—Sheet 1.

S. N. TURNER.
PHOTOGRAPHIC FILM ROLL.

No. 539,713. Patented May 21, 1895.

WITNESSES.
Carrie E. Nichols
M. Alice Willard

INVENTOR.
Samuel N. Turner.
Per Edwin W. Brown.
Attorney.

(No Model.) 2 Sheets—Sheet 2.

S. N. TURNER.
PHOTOGRAPHIC FILM ROLL.

No. 539,713. Patented May 21, 1895.

WITNESSES
Carrie E. Nichols
Miss M. Alice Willard

INVENTOR
Samuel N. Turner.
per Edwin W. Brown.
Attorney.

UNITED STATES PATENT OFFICE.

SAMUEL N. TURNER, OF BOSTON, MASSACHUSETTS.

PHOTOGRAPHIC FILM-ROLL.

SPECIFICATION forming part of Letters Patent No. 539,713, dated May 21, 1895.

Application filed April 21, 1892. Serial No. 430,127. (No model.)

*To all whom it may concern:*

Be it known that I, SAMUEL N. TURNER, of Boston, in the county of Suffolk and State of Massachusetts, have invented certain new and useful Improvements in Photographic Cameras and Film-Rolls, of which the following is a full, clear, and exact description.

The object of the present invention is to provide means in a photographic camera, in which a continuous strip of sensitized sheet material is used for the negative, so that it can be moved the right distance for the exposure of a fresh portion of its surface conveniently and to a certainty for the taking of another picture, and so on for each successive picture, and the invention consists in the combination with a strip of sensitized paper or other flexible sheet material, of a strip of flexible sheet material of an opaque nature superimposed thereon, so opaque that light practically cannot penetrate through it, having certain indicating marks on its outer side in relation to the sensitized sheet, and a camera in which the two sheets are rolled up for use, having an opening through which the marks on the opaque sheet can be seen from the outside, to indicate the movement or location of certain portions of the sensitized sheet in relation to the lens of the camera, as hereinafter described and claimed.

My invention also has for its object the provision of a holder for a strip of sensitized material which, together with the strip of opaque material upon which the sensitized strip is superimposed serves effectually to exclude the entrance of light to said sensitized strip so that the roll can be freely carried about in any light without injury to the sensitized strip and can at any time be placed in the camera, in the field or wherever pictures are being taken without the necessity of using a dark room for the purpose as in present cameras.

To enable others skilled in the art to make and use my invention, I will now describe the same in detail, referring to the drawings, in which—

Figure 2:
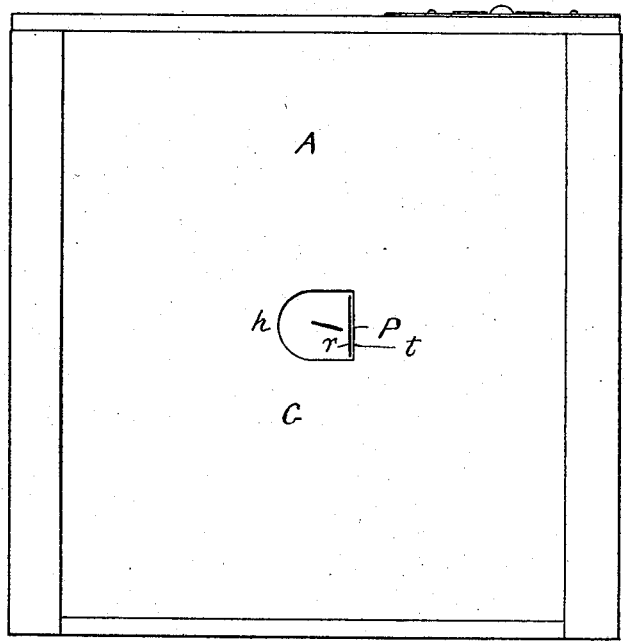
Figure 3:
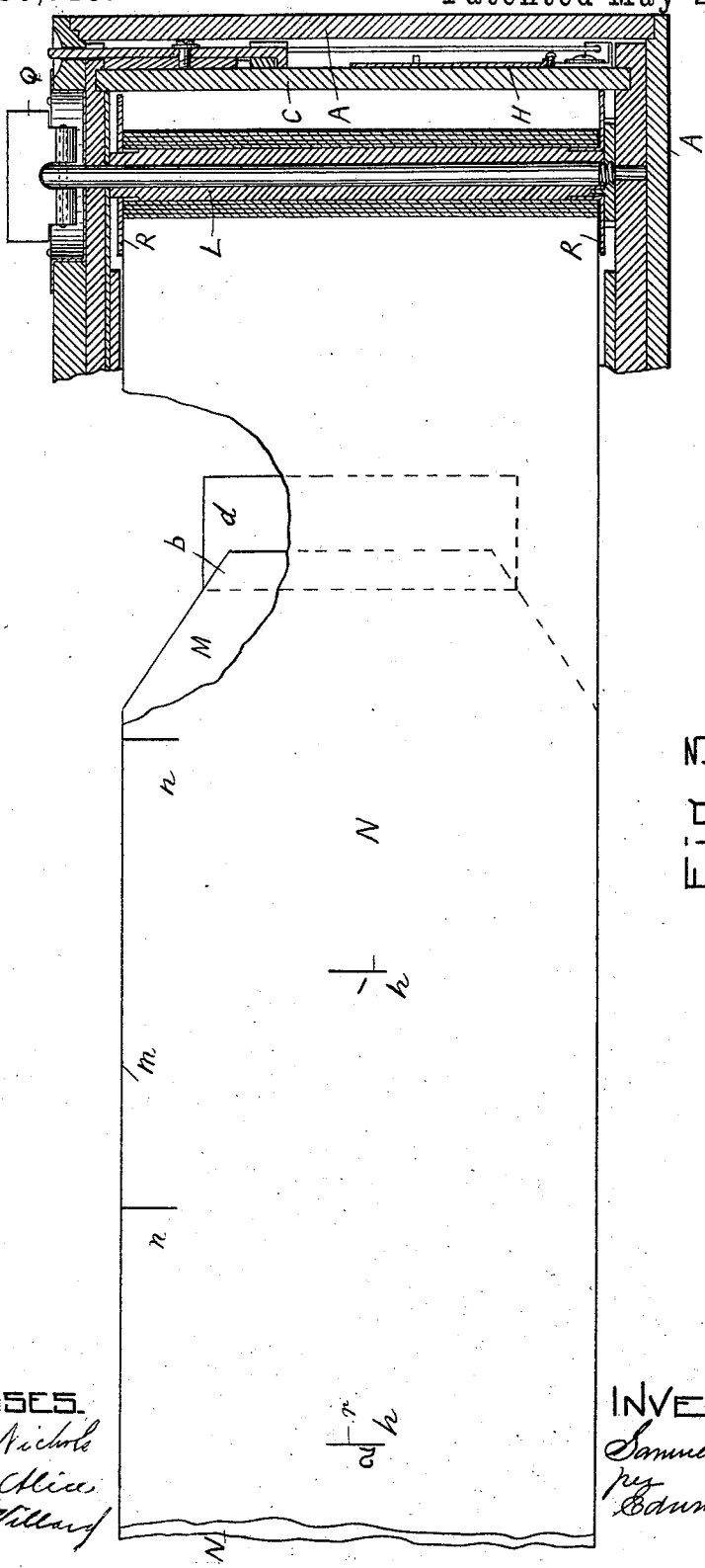

Figure 1 represents in horizontal cross-section a photographic camera having this invention applied thereto. Fig. 2 is an end view of the rear end of the camera on its side. Fig. 3 is a detail section on line 3 3, Fig. 1, and showing in plan view a portion of the opaque sheet, showing the indicating-marks thereon.

In the drawings A represents a box having a suitable photographic lens B, in a partition C, at one end of the box, which is the apex end D of a chamber E, tapering on two sides inside the box, the larger end of the tapering chamber terminating in a circular opening F, a short distance from the opposite end G of the box against and over which circular opening the sensitized sheet lies and moves, as shown in section in Fig. 1.

H is a shutter for the lens on the outside of the partition C.

K, L, are two rollers, on one, K, of which, the sensitized sheet M is rolled before placing it in the camera, from which it is rolled on to the other roller L in using the camera, the sensitized sheet passing from one roller to the other and in such movement it passes over the outer side of the circular opening F, between it and the side G, all of which is constructed and arranged for operation substantially as usual in such cameras, except as to the present invention.

The sensitized sheet or strip M of material, in the present instance is preferably made of celluloid, $a$ being its film side, and N is a sheet or strip of opaque material, which is preferably of paper and of a dark color, and of such a nature that the actinic rays and preferably any rays of light cannot penetrate through it.

The sensitized strip is a little shorter than the opaque strip, and is placed on the opaque strip or superimposed thereon, so that its film side will be outside and so that the opaque strip will extend some distance at each end beyond the sensitized strip, one end of the film strip being secured to the opaque strip near one end, by a piece $d$, of sheet material by paste or any suitable adhesive material or secured thereto in any suitable manner, the sensitized strip being of a length that will take the necessary number of pictures, which is regulated by the amount that can be wound upon the roll K when in the box.

After the strips are secured together, one end of the opaque sheet which is the end to which the sensitized sheet is secured, is secured in any suitable manner to the roll K, and wound thereon and the roll placed in its place in the box. The ends of the two sheets are then passed between the guide boards e, f, toward and over the end of the frame work of the chamber E, and circular opening F and back again to the other roll L to which the end of the opaque sheet is secured, as shown in Fig. 1.

The opaque strip is marked preferably before attaching the two strips together on its outer side g, at regular intervals along a central longitudinal line, by figures 1, 2, 3, and upward, as shown in Fig. 3, at h according to the length of the sensitized strip, and the number of pictures that can be taken thereon, and in between these figures on one edge m, are marks or short lines n, which are the same distance apart as the figures and are arranged alternately therewith.

In the center of the end G of the box is a small opening P, and the numbers h, on the opaque sheet are located in reference to its travel over the circular opening F, so that each number as it so travels will pass behind the opening P, so that in looking from the outside of the box through the opening, the numbers on the opaque sheet as it so travels, can be seen and read one after the other by the person operating the camera.

In using the camera with the sensitized and opaque strips, the two strips are placed together and wound upon the roll K so that as they travel over the circular opening F, the film side of the sensitized strip will face the lens and the marked side of the opaque sheet will be face to the opening P. The sheets are first moved so that the figure 1, can be seen through the opening P as shown in Fig. 2. Then the picture is taken as usual. Then taking hold of the thumb piece Q attached to the roll L, the roll is turned and the strips moved along until the figure 2, can be seen at such opening by which a fresh portion of the film strip is brought in front of the circular opening. Another picture is then taken. The strips are then moved until figure 3, shows at the opening P, bringing a third portion of the film strip in position, when another picture is taken, and so on until the sensitized strip is wholly used, the strips then being wound fully upon the roll L. The roll L is then removed from the camera with the strips wound thereon and taken into the dark room. The two strips are then cut by any suitable instrument at the places marked n, across their widths, which separates the sensitized strip into the several portions each containing an undeveloped picture, which are afterward developed in the usual manner.

The improved roll, as K, is constructed at each end with a laterally extending flange R, said flange preventing the entrance of light to the sensitized strip at the edges whereby when the strip with the opaque strip on which it is superimposed and which is of greater length than the sensitized strip, is wound upon the roll, the sensitized strip is effectually excluded from the effect of light.

By the use of this invention the strips can be wound upon a roll preparatory to inserting it in the box, and freely carried about in any light without injury to the film strip, so that they can be placed in the camera, at any time, in the field or wherever pictures are being taken, without the necessity of doing so as at present in a dark room.

In lieu of numbers or figures for the indicating marks on the opaque strip, other marks can be used that will indicate a succession or sequence, such as for instance the alphabet. The marks can however be all of one kind although it is preferable to use the numbers.

Although it is intended that the opaque strip shall be sufficiently opaque to prevent any action of the light upon the sensitized strip through the opening P it is well to cover the opening with a yellow transparent material such as celluloid or glass, &c., which will doubly insure such result, this construction being shown in section in Fig. 1, in which S is the celluloid sheet secured by the strip T, to the inner side of the end G, of the box.

Underneath each figure on the opaque sheet is a straight line r, which is intended as a guide to indicate when to stop moving the strips, the strips being stopped when such a line comes in line with or close to the edge t, of the opening P, as shown more particularly in Fig. 2.

Having thus described my invention, what I claim is—

1. The herein described new article of manufacture consisting of a strip of opaque material and a continuous strip of sensitized material of a length for a series or number of photographic exposures, superimposed upon said strip of opaque material, a series of marks upon the strip of opaque material on the side opposite the sensitized strip to indicate where the strip is to be stopped for exposure and cut after exposure, said strips of sensitized material and opaque material being adapted to move in unison past an opening in a photographic camera and expose the indicating marks on the strip of opaque material, substantially as described.

2. The combination with a continuous strip of photographic sensitized material of a length for a series or number of photographic plates, of a strip of opaque material superimposed thereon and having on its side opposite the sensitized strip a series of marks to indicate where the strip is to be stopped for exposure and another series of marks to indicate where the strip is to be cut after exposure, said strips of sensitized material and opaque material being adapted to move in unison past an opening in a photographic camera to expose the indicating marks on the strip of opaque material, substantially as described.

3. The herein described new article of manufacture consisting of a roll having at its ends laterally extending flanges, a strip of opaque material having superimposed thereon, and supported thereby, a continuous strip of sensitized material, the strip of opaque material being of greater length and having its ends extending beyond the ends of the strip of sensitized material, said strips of opaque material and superimposed sensitized material being wound upon the roll, the strip of opaque material outermost, whereby the entrance of light to the sensitized material is effectually excluded by the opaque material and the flanged ends of the roll, substantially as described.

In testimony whereof I have hereunto set my hand in the presence of two subscribing witnesses.

SAMUEL N. TURNER.

Witnesses:
 EDWIN W. BROWN,
 CARRIE E. NICHOLS.